US009528043B2

(12) United States Patent
Livanec et al.

(10) Patent No.: US 9,528,043 B2
(45) Date of Patent: Dec. 27, 2016

(54) COMPOSITIONS AND METHODS FOR TREATMENT OF WELL BORE TAR

(71) Applicant: Halliburton Energy Services, Inc., Houston, TX (US)

(72) Inventors: Philip Wayne Livanec, Deer Park, TX (US); Gregory Paul Perez, Pearland, TX (US)

(73) Assignee: Halliburton Energy Services, Inc., Houston, TX (US)

(*) Notice: Subject to any disclaimer, the term of this patent is extended or adjusted under 35 U.S.C. 154(b) by 58 days.

(21) Appl. No.: 14/203,030

(22) Filed: Mar. 10, 2014

(65) Prior Publication Data

US 2014/0194326 A1    Jul. 10, 2014

Related U.S. Application Data

(63) Continuation of application No. 13/329,016, filed on Dec. 16, 2011, now Pat. No. 8,752,626.

(51) Int. Cl.
*C09K 8/52* (2006.01)
*C09K 8/04* (2006.01)
*C09K 8/524* (2006.01)

(52) U.S. Cl.
CPC ........ *C09K 8/524* (2013.01); *C09K 8/04* (2013.01)

(58) Field of Classification Search
CPC .... C04B 28/02; C04B 2103/50; C04B 18/146; C04B 24/36; C04B 22/064; E21B 33/1208; E21B 33/14; E21B 33/1277; E21B 33/13; E21B 33/1216; E21B 33/138; E21B 43/267; E21B 33/10; C09K 3/00; C09K 8/04
See application file for complete search history.

(56) References Cited

U.S. PATENT DOCUMENTS

| | | | |
|---|---|---|---|
| 3,835,117 A | 9/1974 | Walaschek | |
| 3,960,214 A | 6/1976 | Striegler et al. | |
| 5,866,517 A | 2/1999 | Carpenter et al. | |
| 5,969,016 A | 10/1999 | Weber et al. | |
| 6,104,224 A | 8/2000 | Koshikawa | |
| 6,564,869 B2 | 5/2003 | McKenzie et al. | |
| 6,979,705 B2 | 12/2005 | McDowell et al. | |
| 7,081,438 B2 | 7/2006 | Horton | |
| 7,278,485 B2 | 10/2007 | Kirsner et al. | |
| 7,332,458 B2 | 2/2008 | Baltoiu et al. | |
| 7,549,474 B2 | 6/2009 | Valenziano et al. | |
| 7,576,042 B2 | 8/2009 | Lewis | |
| 7,665,523 B2 | 2/2010 | Perez | |
| 7,740,070 B2 | 6/2010 | Santra et al. | |
| 7,879,768 B2 | 2/2011 | Wu | |
| 2004/0129459 A1* | 7/2004 | Guichard | C09K 8/24 175/65 |
| 2005/0037927 A1 | 2/2005 | Horton | |
| 2006/0144594 A1 | 7/2006 | Perez | |
| 2006/0148656 A1 | 7/2006 | Perez | |
| 2007/0114036 A1 | 5/2007 | Perez | |
| 2007/0203028 A1 | 8/2007 | Lewis et al. | |
| 2010/0081584 A1 | 4/2010 | Perez | |
| 2011/0028594 A1* | 2/2011 | Roddy | C04B 28/02 523/130 |
| 2013/0153225 A1 | 6/2013 | Livanec et al. | |
| 2014/0114011 A1* | 4/2014 | Soddemann et al. | 524/510 |

FOREIGN PATENT DOCUMENTS

| | | |
|---|---|---|
| CA | 2451585 | 6/2004 |
| CA | 2481543 | 3/2006 |
| EP | 0980957 | 2/2000 |
| WO | 2004050791 | 6/2004 |
| WO | 2004060790 | 7/2004 |
| WO | 2007041841 | 4/2007 |
| WO | 2009019471 | 2/2009 |

OTHER PUBLICATIONS

International Preliminary Search Report and Written Opinion for International Application No. PCT/US2012/069839 dated Jun. 17, 2014.
Thomson Scientific, London, GB; 1985-043467, XP002512517.
Thomson Scientific, London, GB; 1989-229547, XP002512518.
Warren, et al., "Development and Field Results of a Unique Drilling Fluid Designed for Heavy Oil Sands Drilling," Society of Petroleum Engineers, SPE 92462, pp. 1-9, Feb. 23-25, 2005.
Freeman, et al., "Novel Drilling Fluid Eliminates Tar Problems Associated With Drilling SAGD Wells," Society of Petroleum Engineers, SPE 90986, pp. 1-5, Sep. 26-29, 2004.
Halliburton Product Data Sheet, "Barazon® D", www.haliburton.com/baroid, dated Mar. 25, 2010.
Halliburton Product Data Sheet, "Barazon® D Plus", www.haliburton.com/baroid, dated Mar. 25, 2010.
Halliburton Product Data Sheet, "Dextrid® LT", www.haliburton.com/baroid, dated Mar. 26, 2010.
Halliburton Product Data Sheet, "Baracarb®", www.haliburton.com/baroid, dated Mar. 24, 2010, pp. 1-2.
Halliburton Product Data Sheet, "Baracor® 700", www.haliburton.com/baroid, dated Mar. 24, 2010.
"Tylac® 873 Nitrile Emulsion", MCP, dated Mar. 26, 2007.
MCP Material Safety Data Sheet, "Tylac® 873", dated Feb. 11, 2011, pp. 1-5.
Perez, "Development of a Chemical Treatment for the Management of Wellbore Tar Adhesion", SPE/PS-CIM/CHOA 97721, PS2005-321, pp. 1-8, Nov. 2005.
International Search Report and Written Opinion for Application No. PCT/US2012/069839 dated Mar. 4, 2013.
USPTO Office Action from U.S. Appl. No. 13/329,016 dated Oct. 25, 2013.

* cited by examiner

*Primary Examiner* — Zakiya W Bates
(74) *Attorney, Agent, or Firm* — Tenley Krueger Tumey L.L.P.

(57) ABSTRACT

Of the many compositions and methods, one method includes contacting tar resident in a well bore with a tar stabilizer comprising an acrylonitrile-butadiene copolymer; and allowing the tar stabilizer to interact with the tar to at least partially reduce the tendency of the tar to adhere to a surface.

18 Claims, No Drawings

COMPOSITIONS AND METHODS FOR TREATMENT OF WELL BORE TAR

CROSS-REFERENCED TO RELATED APPLICATIONS

The present application is a continuation of U.S. patent application Ser. No. 13/329,016, filed Dec. 16, 2011, the entire disclosure of which is incorporated herein by reference.

BACKGROUND

Many subterranean operations involve the drilling of a well bore from the surface through rock and/or soil to penetrate a subterranean formation containing fluids that are desirable for production. In the course of drilling and other subterranean operations, the drill string and/or other equipment may come into contact with zones of rock and/or soil containing tar (e.g., heavy hydrocarbons, asphalt, bitumens); in many such operations, it may be desirable to drill the well bore through these tar-containing zones. However, tar is a relatively tacky substance that may readily adhere to any surface that it contacts, including the surfaces of the well bore and/or any equipment utilized during the drilling operation. Tar also may dissolve into many synthetic treatment fluids used in the course of drilling operations, increasing the tacky and adhesive properties of the tar. If a sufficient amount of tar adheres to surfaces in the well bore or drilling equipment, it may, among other problems, prevent the drill string from rotating, prevent fluid circulation, or otherwise impede the effectiveness of a drilling operation. In some cases, it may become necessary to remove and/or disassemble the drill string in order to remove accretions of tar, a process which may create numerous cost and safety concerns. The accretion of tar on drilling equipment and/or in the well bore also can impede any subsequent operations downhole, including cementing, acidizing, fracturing, sand control, and remedial treatments. In addition, soft, tacky tar that manages to reach the surface may foul surface equipment, including solids screening equipment.

Existing methods of managing these problems that result from well bore tar incursion may be problematic. Some of these methods involve effecting an increase in hydrostatic pressure in the well bore so as to force the tar out of the well bore to the surface. However, this increased hydrostatic pressure may damage the well bore and/or a portion of the subterranean formation. Other conventional methods utilize treatment fluids that comprise dispersants, surfactants, and/or solubilizers, which allow the tar particles to dissolve in or homogenize with the treatment fluids. However, the tar particles may not be readily separated out of the fluid once they have dissolved into or homogenized with the fluid. The presence of the tar particles in the treatment fluid may alter its rheological properties and/or suspension capacity, which may limit its use in subsequent operations. Moreover, the addition of these dispersants, surfactants, and solubilizers may increase the complexity and cost of the drilling operation.

SUMMARY

An embodiment discloses a method for treatment of well bore tar. The method may comprise contacting tar resident in a well bore with a tar stabilizer comprising an acrylonitrile-butadiene copolymer. The method may further comprise allowing the tar stabilizer to interact with the tar to at least partially reduce the tendency of the tar to adhere to a surface.

Another embodiment discloses a method for treatment of well bore tar. The method may comprise using a drill bit to enlarge a well bore in a subterranean formation comprising tar. The method may further comprise circulating a drilling fluid past the drill bit to remove cuttings from the drill bit, wherein the drilling fluid comprises an aqueous fluid and a tar stabilizer comprising an acrylonitrile-butadiene copolymer.

Yet another embodiment discloses a treatment fluid that may comprise an aqueous fluid, and an acrylonitrile-butadiene copolymer.

The features and advantages of the present invention will be readily apparent to those skilled in the art. While numerous changes may be made by those skilled in the art, such changes are within the spirit of the invention.

DETAILED DESCRIPTION

Embodiments of the present invention disclose a tar stabilizer comprising an acrylonitrile-butadiene copolymer. As used herein, the tem "tar stabilizer" refers to a material or materials that can interact with tar resident in a well bore such that the tar become less tacky and/or less able to adhere to a surface. In certain embodiments, the tar stabilizer may bind or coat the tar such that the tar becomes less tacky. As a result, tar treated in this manner may be less likely to stick to drill strings and other tubulars used in drilling operations and, thus may be susceptible to screen separation from treatment fluids, drill cuttings, tar sands, and the like.

The acrylonitrile-butadiene copolymer used in the tar stabilizers of the present invention may comprise two or more different monomers that are copolymerized. One monomer that may be copolymerized to form the copolymer is acrylonitrile, which may be substituted or unsubstituted. The second monomer that may be copolymerized to form the copolymer is butadiene, which may also be substituted or unsubstituted. The monomers may be substituted with a number of different groups that will be evident to those of ordinary skill in the art, including without limitation chloro groups, bromo groups, fluoro groups, alkyl groups, alkoxy groups, alkenyl groups, alkynyl groups, aryl groups, alkoxy groups, and substituted versions thereof. The acrylonitrile-butadiene copolymer may be ionic or nonionic in nature. In one embodiment, the acrylonitrile-butadiene copolymer may be anionic. In some embodiments, the acrylonitrile-butadiene copolymer may be carboxylated. In some embodiments, the acrylonitrile content of the copolymer may be from about 1% to about 99% by weight of the copolymer, and the butadiene content may be from about 1% to about 99% by weight of the copolymer. In one embodiment, the acrylonitrile content may be from about 50% to about 95% by weight of the copolymer. In one embodiment, the butadiene content may be from about 5% to about 50% by weight. Embodiments of the copolymer may further be copolymerized with styrene as a third monomer. In one embodiment, the styrene content may be about 1% to about 25% by weight. In one embodiment, the copolymer may be an acrylonitrile-butadiene-styrene copolymer that comprises acrylonitrile from about 50% to about 95% by weight, butadiene from about 5% to about 50% by weight, and styrene from about 1% to about 25% by weight. Other monomers may also be included in the acrylonitrile-butadiene or acrylonitrile-butadiene-styrene copolymer in accordance with embodiments of the present invention. However, the content of the additional monomers may be limited, in some embodiments, to less than about 10% by weight, less than about 5% by weight, or less than about 1% by weight. In one embodiment, the copolymer may be essentially free of additional monomers.

In some embodiments, the acrylonitrile-butadiene copolymer may be used in the form of a latex emulsion or a powder. For example, a latex emulsion may be used that comprises an emulsion-polymerized acrylonitrile-butadiene copolymer. In some embodiments, the latex emulsion may be from about 5% to 60% active, alternatively, from about 20% to about 50% active, or, alternatively, from about 40% to about 45% active. In another embodiment, an acrylonitrile-butadiene copolymer powder may be used that can be dispersed in water. In some embodiments, the acrylonitrile-butadiene copolymer may have a particle size of less than about 1 micron, alternatively, less than about 500 nanometers, or alternatively less than about 100 nanometers.

In accordance with present embodiments, one or more of the tar stabilizers may be included in a treatment fluid as described herein. As used herein, the term "treatment fluid" refers to any fluid that may be used in a subterranean operation in conjunction with a desired function and/or for a desired purpose. The term "treatment fluid" does not imply any particular action by the fluid or any component thereof. Treatment fluids may be used to drill, complete, work over, fracture, repair, or in any way prepare a well bore for recovery of materials residing in a subterranean formation penetrated by the well bore. Examples of include, but are not limited, cement compositions, drilling fluids, spacer fluids, and spotting fluids.

In some embodiments, the tar stabilizer may be present in the treatment fluid in an amount of at least about 1% by volume of the fluid. In some embodiments, the tar stabilizer may be present in the treatment fluid from about 1% to about 70% by volume of the fluid. In some embodiments, the tar stabilizer may be present in the treatment fluid from about 1% to about 10% by volume of the fluid. One of ordinary skill in the art, with the benefit of this disclosure, will be able to determine the appropriate concentration of the styrene-acrylate polymer in the fluid for a particular application.

In some embodiments, the treatment fluid may further comprise an aqueous fluid. For example, the tar stabilizer may be dispersed in the aqueous fluid to form the treatment fluid. In one embodiment, an acrylonitrile-butadiene copolymer latex emulsion may be dispersed in the aqueous fluid. In another embodiment, an acrylonitrile-butadiene copolymer powder may be dispersed in the aqueous fluid. The aqueous fluid utilized in the treatment fluids of the present invention may be fresh water, distilled water, or salt water (e.g., water containing one or more salts dissolved therein). In certain embodiments, the treatment fluid may be an aqueous-based fluid. Generally, the water can be from any source, provided that it does not contain compounds that undesirably affect other components of the treatment fluid.

In some embodiments, the treatment fluid may further comprise a viscosifier to, for example, aid in suspending the tar stabilizer in the treatment fluid. Suitable viscosifying agents may include, but are not limited to, colloidal agents (e.g., clays such as bentonite, polymers, and guar gum), emulsion-forming agents, diatomaceous earth, biopolymers, synthetic polymers, chitosans, starches, gelatins, or mixtures thereof.

Other additives suitable for use in subterranean operations may also be added embodiments of the treatment fluids. Examples of such additives include, but are not limited to, salts, surfactants, fluid-loss-control additives, gas, nitrogen, carbon dioxide, surface-modifying agents, tackifying agents, foamers, corrosion inhibitors, scale inhibitors, catalysts, clay-control agents, biocides, friction reducers, anti-foam agents, bridging agents, dispersants, flocculants, hydrogen sulfide scavengers, carbon dioxide scavengers, oxygen scavengers, lubricants, viscosifiers, breakers, weighting agents (e.g., barite), relative-permeability modifiers, resins, particulate materials (e.g., proppant particulates), wetting agents, coating-enhancement agents, and the like. Weighting agents may be used in treatment fluids, such as drilling fluids, to provide a density sufficient to, for example, control formation pressures. One of ordinary skill in the art, with the benefit of this disclosure, will be able to determine which additional additives are appropriate for a particular application.

As will be appreciated by those of ordinary skill in the art, with the benefit of this disclosure, embodiments of the treatment fluids may be used in a variety of subterranean operations for treatment of tar resident in a well bore. By treatment of the tar with a tar stabilizer, as described herein, the adhesiveness of the tar may be reduced, thus facilitating removal of the tar from a well bore or other surface, for example. In some embodiments, the present invention discloses a method comprising contacting tar resident in a well bore with a tar stabilizer comprising an acrylonitrile-butadiene copolymer, and allowing the tar stabilizer to interact with the tar to at least partially reduce the tendency of the tar to adhere to a surface. In this manner, the removal of the tar from the well bore or other surface may be facilitated. In one embodiment, a treatment fluid comprising the tar stabilizer may be introduced into the well bore such that the tar stabilizer contacts the tar. One of ordinary skill in the art, with the benefit of this disclosure, should be able to determine the appropriate amount of time to allow the tar stabilizer to interact with the tar so as to at least partially reduce the adhesiveness of the tar. In certain embodiments, after the tar stabilizer has been allowed to interact with the tar, the tar then may be removed from the well bore by any means practicable for the given application.

In some embodiments, a treatment fluid comprising a tar stabilizer may be introduced into a well bore as a drilling fluid. For example, a drill bit may be used to enlarge the well bore, and the treatment fluid comprising the tar stabilizer may be circulated in the well bore past the drill bit. In some embodiments, the drilling fluid may be passed down through the inside of a drill string, exiting at a distal end thereof (e.g., through the drill bit), and returned to the surface through an annulus between the drill string and a well bore wall. Among other things the circulating drilling fluid should lubricate the drill bit, carry drill cuttings to the surface, and/or balance formation pressure exerted on the well bore. In certain embodiments, the drilling fluid may have a density in the range of from about 7.5 pounds per gallon ("lb/gal") to about 18 lb/gal, and alternatively from about 12 lb/gal to about 18 lb/gal.

Embodiments of the treatments fluids may be used as a drilling fluid, for example, where it is desirable to drill through tar encountered in the course of drilling the well bore. In this manner, the tar stabilizer contained in the treatment fluid may modify at least a portion of tar such that is becomes less tacky, making it less likely to stick to drill strings and other tubulars used in drilling operations. Tar modified in this way may yield tar cuttings that can be removed more effectively from the well bore. Additionally, tar that is drilled through may be less likely to flow into the well bore or the subterranean formation as the plastic properties of the tar may be altered. Similarly, the treated tar that forms about the surface of the well bore may act to stabilize the well bore. In addition, tar treated with the tar stabilizers may be separated from a treatment fluid by passing the fluid through a screen or similar separation apparatus.

In some embodiments, a treatment fluid comprising a tar stabilizer may be introduced into a well bore as a pill for spot treatment, wherein the treatment fluid is introduced into the well bore to interact with tar in a specific portion of the well bore. The pill should enter the well bore and interact with tar residence in the well bore, thus modifying at least a portion of the tar such that is become less tacky. In certain embodiments of this type, the tar stabilizer may be allowed to interact with the tar resident in the well bore for at least a time sufficient to at least partially reduce the adhesiveness of the tar. In some embodiments, this may be more than about one hour. In others, more time will be required to at least partially reduce the adhesiveness of the tar, depending upon, among other factors, the temperature inside the well bore and the amount of tar in the portion of the well bore being treated. One of ordinary skill in the art, with the benefit of this disclosure, will be able to determine the appropriate amount of time to allow the tar stabilizer to interact with the tar. In certain embodiments, after the tar stabilizer has been allowed to interact with the tar, the tar then may be removed from the well bore by any means practicable for the given application. In some embodiments, the pill may be used ahead of and/or behind a non-aqueous drilling fluid, which may comprise any number of organic liquids, including, but are not limited to, mineral oils, synthetic oils, esters, paraffin oils, diesel oil, and the like.

In some embodiments, the amount of the tar stabilizer present in the treatment fluid may be monitored while the tar stabilizer is circulated in the well bore. For example, once a unit of tar stabilizer in a treatment fluid is allowed to interact with a unit of tar in a well bore, that unit of the tar stabilizer may be depleted from the treatment fluid and thus unable to interact with additional tar. For this reason, it may be desirable to monitor the concentration of the tar stabilizer in the treatment fluid to determine if more should be added. In some embodiments, the tar stabilizer may be added to the treatment fluid before the treatment fluid is introduced into the well bore, for example, a batch-mixing process. In some embodiments, it may be desirable to continue to add the tar stabilizer to the treatment fluid (e.g., "on-the-fly" mixing) according to the monitored concentration of the tar stabilizer in the treatment fluid. In some embodiments, the concentration of tar stabilizer in the treatment fluid may be monitored by direct measurement. In some embodiments, the concentration of tar stabilizer in the treatment fluid may be monitored indirectly by measuring the depletion of the tar stabilizer from the treatment fluid. The concentration of the tar stabilizer in the treatment fluid may be monitored, for example, by analytical polymer spectroscopy, chromatography, gravimetry, and quantitative precipitation.

To facilitate a better understanding of the present invention, the following examples of specific embodiments are given. In no way should the following examples be read to limit or define the entire scope of the invention.

EXAMPLES

The following tests were performed to evaluate the use of a carboxylated acrylonitrile-butadiene copolymer as a tar stabilizer. The sample drilling fluid contained: freshwater; BARAZAN® D Plus viscosifier, which is a powdered Xanthan gum; DEXTRID® LT filtration control agent, which is a modified starch; sodium hydroxide; BARACARB® 25 bridging agent, which is sized-ground marble; BARACOR® 700 corrosion inhibitor; and REV DUST additive, which is a modified calcium montmorillonite clay commonly used to simulate drill cuttings. BARAZAN® D Plus viscosifier, DEXTRID® LT filtration control agent, BARACARB® 25 bridging agent, and BARACOR® 700 corrosion inhibitor are each available from Halliburton Energy Services, Inc. The amount of each component in the sample drilling fluid is provided in the table below.

TABLE 1

| Sample Drilling Fluid | |
|---|---|
| Fresh Water (bbl) | 0.976 |
| | (341.8 mL) |
| BARAZAN ® D Plus Viscosifier (lb) | 0.877 |
| DEXTRID ® LT Filtration Control Agent (lb) | 5.261 |
| Sodium Hydroxide (lb) | 0.035 |
| BARACARB ® 25 Bridging Agent (lb) | 8.768 |
| BARACOR ® 700 corrosion inhibitor (lb) | 6 |
| REV DUST additive (lb) | 1.754 |

To the sample drilling fluid, a carboxylated acrylonitrile-butadiene copolymer latex emulsion was added in different quantities to determine its effect on well bore tar. The acrylonitrile-butadiene copolymer latex emulsion was about 42% to about 44% active. Tar sands with about 70-80% sands by weight and about 20-30% bitumen by weight were used in this test. A steel bar was used to mimic the drill strings interaction with the oil sands. For each test, the tar sands were placed in a lab barrel together with the sample drilling fluid and a steel bar. The barrel was hot rolled at the indicated temperature for 16 hours under 200 psi in a rolling cell. After hot rolling, the steel bar was visually inspected for tar accretion. The steel bar was rinsed to remove accreted tar. In addition, the mass of the bar was determined both before testing and with accreted tar. The amount of accreted tar for each test is reported in the table below.

TABLE 2

| Test | 1 (Comp.) | 2 | 3 | 4 | 5 |
|---|---|---|---|---|---|
| Sample Drilling Fluid (mL) | 120 | 120 | 120 | 120 | 120 |
| Tar Sands (lb/bbl) | 85.5 (29.3 g per 120 mL) | 85.5 (29.3 g per 120 mL) | 85.5 (29.3 g per 120 mL) | 85.5 (29.3 g per 120 mL) | 85.5 (29.3 g per 120 mL) |
| Copolymer Latex (lb/bbl) (SG = ~1) | — | 10 (28.5 L/m$^3$) | 30 (85.5 L/m$^3$) | 10 (28.5 L/m$^3$) | 30 (85.5 L/m$^3$) |
| Hot Roll Temp. (° C.) | ~22 (Room Temp.) | ~22 (Room Temp.) | ~22 (Room Temp.) | 70 | 70 |
| Hot Roll Time (hrs) | 16 | 16 | 16 | 16 | 16 |

TABLE 2-continued

| Test | 1 (Comp.) | 2 | 3 | 4 | 5 |
|---|---|---|---|---|---|
| Post-Accretion Rod Mass (g) | 341.89 | 335.06 | 340.16 | 340.05 | 334.57 |
| Post-Accretion Rod Mass (g) | 346.76 | 344.88 | 346.83 | 340.05 | 334.73 |
| Mass of accreted tar (g) | 4.87 | 9.82 (0.0 after rinsing) | 6.67 (0.0 after rinsing) | 0.0 | 0.16 (0.0 after rinsing) |
| Observations | Tar was very sticky and adhesive. Tar was stuck to and covering the bar and additional was floating on surface as a thin, sticky layer. Fluid was heavily contaminated. | Some tar was mechanically pressed to bar but came off extremely easily. Tar was not sticky or tacky. Tar was very rubbery. Fluid was not contaminated. | Some tar was mechanically pressed to bar but came off extremely easily. Tar was not sticky or tacky. Tar was very rubbery. Fluid was not contaminated. | No tar stuck to the bar. Tar was found floating on surface as a non-sticky, rubbery tar ball. A thin layer of tar was mechanically pressed to the inside of the cell. Fluid was not contaminated. Sand was also well separated and found on bottom of cell. | No tar was tuck to bar. Tar was found floating on surface as a non-sticky, rubbery ball. Fluid was not contaminated. Sand was also well separated and found on bottom of cell. |

While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. A well bore drilling fluid comprising:
   an aqueous fluid;
   a weighting agent; and
   an acrylonitrile-butadiene copolymer,
   wherein the acrylonitrile content of the copolymer is about 1% to about 99% by weight of the copolymer, and the butadiene content is about 1% to about 99% by weight of the copolymer,
   wherein the acrylonitrile is substituted with at least one group selected from the group consisting of a chloro group, a bromo group, a fluoro group, an alkyl group, an alkoxy group, an alkenyl group, an alkynyl group, and an aryl group, and
   wherein the well bore drilling fluid has a density of from about 7.5 pounds per gallon to about 18 pounds per gallon.

2. The fluid of claim 1, wherein the acrylonitrile-butadiene copolymer is carboxylated.

3. The fluid of claim 1, wherein the acrylonitrile-butadiene copolymer further comprises a styrene.

4. The fluid of claim 3, wherein the acrylonitrile-butadiene copolymer comprises an additional monomer in an amount of less than about 1% by weight.

5. The fluid of claim 1, wherein the acrylonitrile-butadiene copolymer comprises acrylonitrile in an amount of about 50% to about 95% by weight of the copolymer, butadiene in an amount of about 5% to about 50% by weight of the copolymer, and styrene in an amount up to about 25% by weight of the copolymer.

6. The fluid of claim 1, wherein the acrylonitrile-butadiene copolymer is an emulsion-polymerized acrylonitrile-butadiene copolymer.

7. The fluid of claim 1, wherein the acrylonitrile-butadiene copolymer is anionic.

8. The fluid of claim 1, wherein the acrylonitrile-butadiene copolymer is present in the well bore drilling fluid in an amount of about 1% to about 70% by volume of the well bore drilling fluid.

9. The fluid of claim 1, wherein the acrylonitrile-butadiene copolymer is present in the well bore drilling fluid in an amount of about 1% to about 10% by volume of the well bore drilling fluid.

10. The fluid of claim 1, wherein the well bore drilling fluid further comprises a viscosifier selected from the group consisting of a colloidal agent, a clay, a polymer, guar gum, an emulsion-forming agent, diatomaceous earth, a biopolymer, a synthetic polymer, chitosan, a starch, a gelatin, and any mixture thereof.

11. The fluid of claim 1, wherein the well bore drilling fluid further comprises at least one additive selected from the group consisting of a salt, a surfactant, a fluid-loss-control additive, a gas, nitrogen, carbon dioxide, a surface-modifying agent, a tackifying agent, a foamer, a corrosion inhibitor, a scale inhibitor, a catalyst, a clay-control agent, a biocide, a friction reducer, an antifoam agent, a bridging agent, a dispersant, a flocculant, hydrogen sulfide scavenger, carbon dioxide scavenger, an oxygen scavenger, a lubricant, a viscosifier, a breaker, barite, a relative-permeability modifier, a resin, a particulate material, a proppant particulate, a wetting agent, a coating-enhancement agent, and any combination thereof.

12. A well bore drilling fluid comprising:
an aqueous fluid;
a weighting agent; and
an acrylonitrile-butadiene copolymer,
wherein the acrylonitrile content of the copolymer is about 1% to about 99% by weight of the copolymer, and the butadiene content is about 1% to about 99% by weight of the copolymer,
wherein the well bore drilling fluid has a density of from about 7.5 pounds per gallon to about 18 pounds per gallon,
wherein the well bore drilling fluid further comprises well bore tar that is not emulsified, wherein the acrylonitrile-butadiene copolymer coats or encapsulates the well bore tar such that the well bore tar is less tacky.

13. A well bore drilling fluid comprising:
an aqueous fluid;
a weighting agent; and
an acrylonitrile-butadiene copolymer,
wherein the acrylonitrile content of the copolymer is about 1% to about 99% by weight of the copolymer, and the butadiene content is about 1% to about 99% by weight of the copolymer,
wherein the butadiene is substituted with at least one group selected from the group consisting of a chloro group, a bromo group, a fluoro group, an alkyl group, an alkoxy group, an alkenyl group, an alkynyl group, and an aryl group, and
wherein the well bore drilling fluid has a density of from about 7.5 pounds per gallon to about 18 pounds per gallon.

14. The fluid of claim 13, wherein the acrylonitrile-butadiene copolymer is carboxylated.

15. The fluid of claim 13, wherein the acrylonitrile-butadiene copolymer further comprises a styrene.

16. The fluid of claim 15, wherein the acrylonitrile-butadiene copolymer comprises an additional monomer in an amount of less than about 1% by weight.

17. The fluid of claim 13, wherein the acrylonitrile-butadiene copolymer comprises acrylonitrile in an amount of about 50% to about 95% by weight of the copolymer, butadiene in an amount of about 5% to about 50% by weight of the copolymer, and styrene in an amount up to about 25% by weight of the copolymer.

18. The fluid of claim 13, wherein the acrylonitrile-butadiene copolymer is an emulsion-polymerized acrylonitrile-butadiene copolymer.

* * * * *